9805X
B. DOUGLAS.
COOK STOVE.
Patented June 30, 1836.
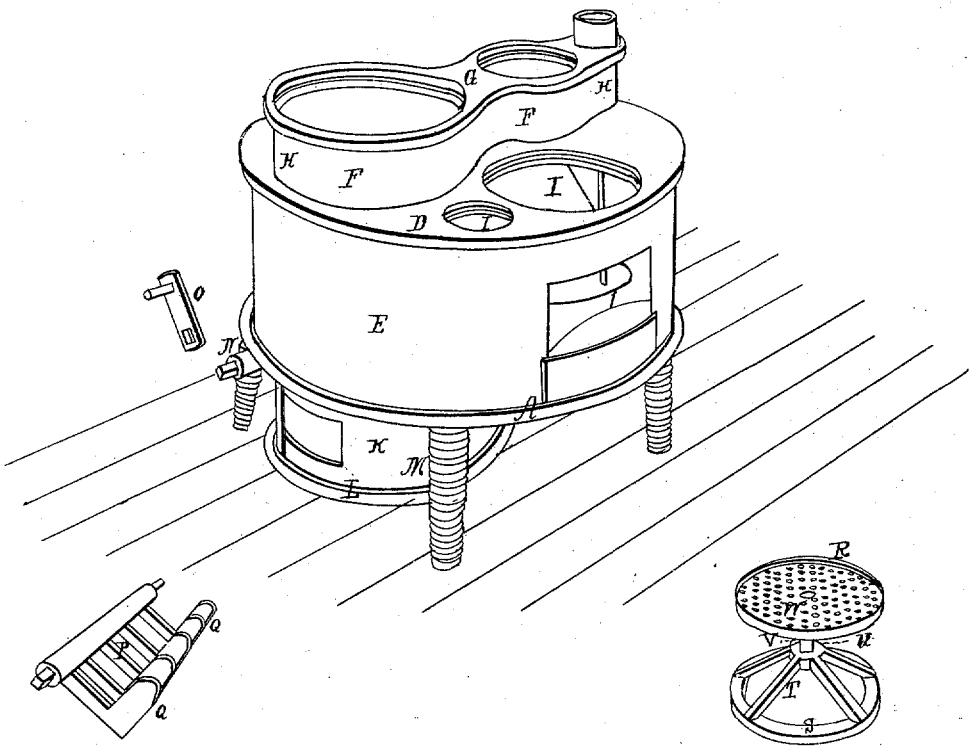
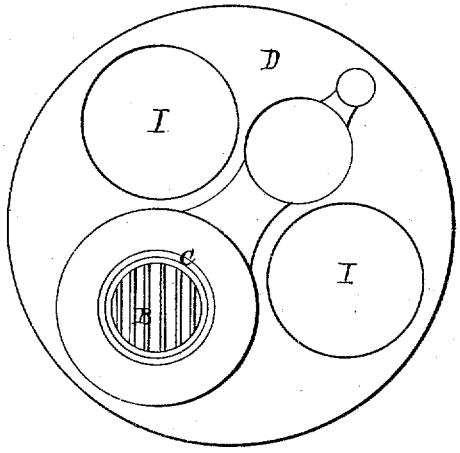
THE NORRIS PETERS CO., PHOTO-LITHO., WASHINGTON, D. C.

9805X

June 30, 1836

Beriah Douglas, Albany New York,

Letters Patent.

The Schedule referred to in these Letters Patent and making part of the same, containing a description in the words of the said Beriah Douglas, himself of his improvement in the ornamental Parlour Stove.

Be it known that I, Beriah Douglas, of the City & County of Albany, and State of New-York, have invented an improvement in the useful arts, being an ornamental parlour Stove, which is described as follows, reference being had to the annexed drawings of the same making part of this specification. This parlour Stove consists of a circular cast iron plate a, of about sixteen inches in diameter placed horizontally on legs four inches high, grooved in the upper margin forming the bottom of the ash receiver, or ash box. curved plates b, in segments six inches high are made to stand upright all around in the groove just mentioned, except a space for the door c, to take out the ashes. another plate f. of the same size and grooved to correspond with the lower one, covers the side pieces and forms the top of the ash box. The centre of this plate is cut out for the grate g. to set in, over which is erected the cylinder or firebox h. which is about eleven inches high. The upper margin of the top of the ash box being grooved, sections of a curved plate i. of the same height of the firebox perforated all round in a tasteful manner are set upright in said groove. Another 16 inch plate K. grooved in the under edge to correspond with the groove in the middle plate below is placed on top of the curved pieces the upper ends of which enter the groove. Rods screwed into the under side of the upper plate pass down inside of the perforated plates through the lower plates and are fastened with screws confining the whole together. The centre of the top plate is cut out to receive the top of the firebox, over which which

9805X

June 30, 1836 which is placed a collar 6, forming a flue made in the same man
ner as those on the cooking stove patented by me. The shaker or poker
to clean the grate from ashes is made in the same manner as the one in
my cooking stove. At each side of the collar is left a hole in the plate
sufficiently large to pass the hand through the same to clean the stove.
Another similar hole is made in the top of the ash box into which
the dirt around the cylinder may be swept. The covers designed to
fill the holes in the top plate are perforated with apertures
The remainder of the plate also is perforated in any manner to suit the
fancy of the constructor. The use of these perforations or openwork
around and over the fire box is to facilitate the diffusion of
heat, soften the glaring appearance of the inner cylinders when
red hot; and give to the stove symetrical proportion and beautiful
appearance. What I claim as my invention and which I desire
to secure by letters Patent, consists in the combination and
arrangement of the several parts of the before described ornamen
tal parlour stove, particularly the perforated plates surround
-ing the fire box. In testimony whereof I have hereunto set my
hand this twenty third day of May A.D. 1836.

[illegible] Witnesses
Wm. P. Elliot
J. C. F. Salomon

Beriah Douglas

[6244 Words

Date of Patent June 30th 1836.

Drawings